US006481649B1

(12) United States Patent
Schmidt

(10) Patent No.: US 6,481,649 B1
(45) Date of Patent: Nov. 19, 2002

(54) METHOD FOR GRANULATING AEROGELS

(75) Inventor: Marc Schmidt, Riedstadt (DE)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/433,931

(22) Filed: Nov. 1, 1999

Related U.S. Application Data

(63) Continuation of application No. PCT/EP98/02519, filed on Apr. 29, 1998.

(30) Foreign Application Priority Data

May 2, 1997 (DE) .......................... 197 18 740

(51) Int. Cl.⁷ ............................................... B02C 19/12
(52) U.S. Cl. ..................... 241/3; 241/21; 241/101.8; 366/279; 366/348
(58) Field of Search ................................ 366/279, 348; 241/21, 101.8, 3

(56) References Cited

U.S. PATENT DOCUMENTS

| | | |
|---|---|---|
| 2,093,454 A | 9/1937 | Kistler |
| 2,541,137 A | 2/1951 | Warrick |
| 2,680,696 A | 6/1954 | Broge |
| 2,786,042 A | 3/1957 | Iler |
| 2,886,460 A | 5/1959 | Alexander et al. |
| 2,978,298 A | 4/1961 | Wetzel |
| 3,015,645 A | 1/1962 | Tyler |
| 3,024,126 A | 3/1962 | Brown |
| 3,122,520 A | 2/1964 | Lentz |
| 3,615,142 A | 10/1971 | Dahlbom |
| 3,794,713 A | 2/1974 | Aboutboul |
| 3,872,217 A | 3/1975 | Merz |
| 4,101,442 A | 7/1978 | Rosen |
| 4,101,443 A | 7/1978 | Rosen |
| 4,190,457 A | 2/1980 | McDaniel |
| 4,344,800 A | 8/1982 | Lutz |
| 4,382,070 A | 5/1983 | Novak et al. |
| 4,667,417 A | 5/1987 | Graser et al. |
| 4,704,374 A * | 11/1987 | Jacques ........................ 502/8 |
| 4,873,218 A | 10/1989 | Pekala |
| 4,888,369 A | 12/1989 | Moore |
| 4,906,676 A | 3/1990 | Ida |
| 4,950,502 A | 8/1990 | Saam |
| 5,001,183 A | 3/1991 | Sands |
| 5,009,874 A | 4/1991 | Parmentier |
| 5,069,815 A | 12/1991 | Aoki et al. |
| 5,081,163 A | 1/1992 | Pekala |
| 5,122,291 A | 6/1992 | Wolff et al. |
| 5,215,733 A | 6/1993 | Potter |
| 5,275,796 A | 1/1994 | Tillotson |
| 5,294,480 A | 3/1994 | Mielke et al. |
| 5,409,683 A | 4/1995 | Tillotson |
| 5,455,216 A | 10/1995 | Mueller et al. |
| 5,484,818 A | 1/1996 | De Vos |
| 5,496,527 A | 3/1996 | Yokogawa |
| 5,508,341 A | 4/1996 | Mayer |
| 5,556,892 A | 9/1996 | Pekala |
| 5,561,318 A | 10/1996 | Gnade |
| 5,565,142 A | 10/1996 | Deshpande |
| 5,595,593 A | 1/1997 | Burns |
| 5,625,013 A | 4/1997 | Mueller et al. |
| 5,651,921 A | 7/1997 | Kaijou |
| 5,674,962 A | 10/1997 | Ito et al. |
| 5,705,535 A | 1/1998 | Jansen |
| 5,708,069 A | 1/1998 | Burns |
| 5,738,801 A | 4/1998 | Ziegler et al. |
| 5,750,610 A | 5/1998 | Burns |
| 5,759,506 A | 6/1998 | Jansen et al. |
| 5,786,059 A | 7/1998 | Frank et al. |
| 5,795,556 A | 8/1998 | Jansen et al. |
| 5,811,031 A | 9/1998 | Jansen et al. |
| 5,866,027 A | 2/1999 | Frank |
| 5,888,425 A | 3/1999 | Schwertfeger |
| 5,948,314 A * | 9/1999 | Geiss et al. ............. 106/287.11 |
| 6,040,375 A | 3/2000 | Behme et al. |
| 6,129,949 A | 10/2000 | Schwertfeger et al. |

FOREIGN PATENT DOCUMENTS

| | | |
|---|---|---|
| CH | 528 298 | 1/1969 |
| DE | 261 581 | 6/1913 |
| DE | 296 898 | 12/1915 |
| DE | 296 898 | 3/1917 |
| DE | 896 189 | 11/1953 |
| DE | 1 667 078 | 5/1971 |
| DE | 2 103 243 | 8/1972 |
| DE | 3 025 437 | 4/1980 |
| DE | 33 29 016 | 2/1985 |
| DE | 3 329 016 | 2/1985 |
| DE | 261 581 | 11/1988 |
| DE | 43 42 548 | 12/1993 |
| DE | 44 04 701 | 2/1994 |
| DE | 44 37 424 | 10/1994 |
| DE | 43 16 540 | 11/1994 |
| DE | 195 06 141 | 2/1995 |
| DE | 195 41 279 | 6/1995 |
| DE | 195 34 198 | 9/1995 |
| DE | 195 41 715 | 9/1995 |
| DE | 195 41 992 | 10/1995 |
| DE | 195 37 821 | 11/1995 |
| DE | 196 31 267 | 2/1996 |
| DE | 44 30 669 | 3/1996 |
| DE | 195 02 453 | 9/1996 |
| DE | 196 48 798 | 11/1998 |
| EP | 0 031 166 | 7/1981 |
| EP | 0 171 722 | 2/1986 |

(List continued on next page.)

OTHER PUBLICATIONS

Gesser, H.D., *Chem.Rev.* 1989, 89, 765.
Kistler, S.S., *Nature*, 1931, 127, 741.
Ullmann's *Encyclopedia of Industrial Chemistry*, p. 603.

(List continued on next page.)

*Primary Examiner*—Mark Rosenbaum
(74) *Attorney, Agent, or Firm*—Tim A. Cheatham

(57) ABSTRACT

A method is disclosed for the structural agglomeration of aerogel particles. The method comprises the steps of feeding aerogel particles to a mixing apparatus. A binder also is added to the mixing apparatus. After thorough mixing agglomerates from the mixing apparatus optionally are separated according to their size.

8 Claims, No Drawings

FOREIGN PATENT DOCUMENTS

| | | |
|---|---|---|
| EP | 0 199 930 | 11/1986 |
| EP | 0 396 076 | 4/1990 |
| EP | 0 552 484 | 7/1993 |
| EP | 0 589 350 | 3/1994 |
| EP | 0 658 513 | 12/1994 |
| GB | 607234 | 8/1948 |
| GB | 682574 | 11/1952 |
| GB | 783868 | 10/1955 |
| WO | WO 92/03378 | 3/1992 |
| WO | WO 92/20623 | 11/1992 |
| WO | WO 94/22943 | 10/1994 |
| WO | WO 94/25149 | 11/1994 |
| WO | WO 95/03358 | 2/1995 |
| WO | WO 95/06617 | 3/1995 |
| WO | WO 96/06809 | 3/1996 |
| WO | WO 96/14266 | 5/1996 |
| WO | WO 96 15997 | 5/1996 |
| WO | WO 96/19607 | 6/1996 |
| WO | WO 96/22942 | 8/1996 |
| WO | WO 96/25850 | 8/1996 |
| WO | WO 96/25950 | 8/1996 |
| WO | WO 97/10187 | 3/1997 |
| WO | WO 97/10187 A1 | 3/1997 |
| WO | WO 97 10188 | 3/1997 |
| WO | WO 97/17287 | 5/1997 |
| WO | WO 97/17288 | 5/1997 |
| WO | WO 97/18161 | 5/1997 |
| WO | WO 98/05591 | 2/1998 |
| WO | WO 99/64504 | 12/1999 |

OTHER PUBLICATIONS

Urbaniak, W., *React.Kinet.Catal.Lett.* 1987, 34, 129.
U.S.S.N. 09/231,356 (corresponding to WO 99/36356).
U.S.S.N. 09/231,366 (corresponding to WO 99/36358).
U.S.S.N. 09/229,179 (corresponding to WO 99/36479).
U.S.S.N. 09/229,275 (corresponding to WO 99/36480).
U.S.S.N. 09/308,888 (corresponding to WO 98/23366).
U.S.S.N. 09/430,982 (corresponding to WO 98/50145).
U.S.S.N. 09/403,270 (corresponding to WO 98/47594).
U.S.S.N. 09/447,030 (corresponding to WO 98/53905).
U.S.S.N. 09/444,469 (corresponding to WO 98/53906).
U.S.S.N. 09/578,665 (corresponding to WO 99/26880).
U.S.S.N. 09/594,000 (corresponding to WO 99/32218).
U.S.S.N. 09/609,012 (corresponding to WO 99/36170).
U.S.S.N. 09/607,099 (corresponding to WO 99/36354).
U.S.S.N. 08/849,297.
U.S.S.N. 08/836,935.
U.S.S.N. 08/981,802.

* cited by examiner

METHOD FOR GRANULATING AEROGELS

This is a Continuation of PCT/EP98/02519, filed Apr. 29, 1998.

The object of the present invention is a method of granulating aerogels.

Aerogels, particularly those with a porosity above 60% and a density of less than 0.6 g/cu.cm display extremely low thermal conductivity and are therefore used as a heat insulating material, as is described in EP-A-0 171 722, as catalysts or as catalyst carriers and also as adsorption material. Furthermore, by virtue of their very low refraction index for solid substances, it is known to use them for Cerenkov detectors. Further, by reason of their particular acoustic impedance, the literature describes a possible use as an impedance adaptation means, for example in the ultrasound range.

It is also possible for them to be used as carriers for effective substances in pharmacy or agriculture.

Aerogels in the broader sense, e.g. in the sense of "gel with air as the dispersion agent" are produced by the drying of a suitable gel. The term "aerogel" in this sense embraces aerogels in the narrower sense, xerogels and cryogels. In this respect, a dried gel is termed an aerogel in the narrower sense when the liquid of the gel is eliminated at above critical temperature and starting from pressures above critical pressure. On the other hand, if the liquid is eliminated from the gel under sub-critical conditions, for example with the formation of liquid/vapor interphase, then the resulting gel is frequently referred to also as a xerogel.

When the term aerogels is used in the present invention, these are aerogels in the broader sense, i.e. in the sense of "gel with air as the dispersion medium".

The term does not include aerogels known from earlier literature and which are obtained for example by precipitation of silicic acid (e.g. DE 3025437, DD 296 898) or which occur as pyrogenic silicic acid, e.g. Aerosil™. In these cases, during manufacture, no three-dimensional gel lattice develops which is homogeneous over relatively great distances.

Where aerogels are concerned, it is possible basically to differentiate between inorganic and organic aerogels.

Inorganic aerogels have already been known since 1931 (S. S. Kistler, Nature 1931, 127, 741). Since then, aerogels have been forthcoming from various starting materials. In this respect, for example $SiO_2$—, $Al_2O_3$—, $TiO_2$—, $ZrO_2$—, $SnO_2$—, $Li_2O$—, $CeO_2$—, $V_2O_6$-aerogels and mixtures of these were produced (H. D. Gesser, P. C. Goswami, Chem. Rev. 1989, 89, 765 et seq.)

For some years, organic aerogels have also been known which are derived from the most widely diverse starting materials, e.g. melamine formaldehyde (R. W. Pekala, J. Mater, Sci. 1989, 24, 3221).

Inorganic aerogels can thereby be produced in different ways.

On the one hand, $SiO_2$ aerogels can for example be produced by acid hydrolysis and condensation of tetra-ethyl orthosilicate in ethanol. During this process, a gel is produced which can be dried by super-critical drying while its structure is maintained. Production methods based on this drying technique are known for example from EP-A-0 396 076, WO 92/03378 or WO 95/06617.

The high pressure technique involved in the super-critical drying of aerogels is however an expensive process and involves a high security risk. In addition, however, super-critical drying of aerogels is a very cost-intensive production method.

An alternative to super-critical drying is afforded by a method for the sub-critical drying of $SiO_2$ gels.

The costs involved in sub-critical drying are substantially less by reason of the simpler technology, the lower energy costs and the lower safety risk.

The $SiO_2$ gels can for example be obtained by acid hydrolysis of tetra-alkoxy silanes in a suitable organic solvent by means of water. Once the solvent has been exchanged for a suitable organic solvent, the gel obtained is in a further step reacted with a silylating agent. The $SiO_2$ gel resulting from this can then, from an organic solvent, be dried in air. Thus, aerogels with densities of less than 0.4 g/cu.cm and porosities above 60% can be achieved. The production method based on this drying technique is described in detail in WO 94/25149.

Furthermore, the above-described gels can, prior to drying and in the alcohol-aqueous solution, be mixed with tetra-alkoxy silanes and aged, in order to increase the gel lattice strength, as disclosed in WO 92/20623.

The tetra-alkoxy silanes used as starting materials in the above-described processes do, however, likewise represent an extremely high cost factor.

A not inconsiderable cost reduction can be achieved by using water-glass as a starting material for the production of $SiO_2$ gels. To this end, it is possible for example to produce a silicic acid from an aqueous water-glass solution with the help of an ion exchange resin, the silicic acid then being polycondensed by the addition of a base to produce an $SiO_2$ gel. After exchange of the aqueous medium for a suitable organic solvent, it is then possible in a further step to react the resulting gel with a silylating agent containing chlorine. The $SiO_2$ gel which is surface modified for example with methyl silyl groups can then be dried in air from an organic solvent. The production method based on this technique is known from DE-A-43 42 548.

Alternative methods with regard to the production of an $SiO_2$ aerogel from water-glass with subsequent sub-critical drying are described in German Patent Application 195 41 715.1 and 195 41 992 8.

Furthermore, DE-A-195 02 453 describes a use of chlorine-free silylating agents during the production of sub-critically dried aerogels.

Furthermore, an organofunctionalisation by means of organofunctionalised silylating agent in the production of sub-critically dried aerogels is described in DE-A-195 34 198.

However, based on current process technology and manufacturing costs, the production of aerogel particles on a major industrial scale is limited to particle sizes less than 5 mm and preferably less than 2 mm.

So, typically a plurality of washing and solvent exchange stages are required in producting aerogels. Since these are diffusion-dependent, the time required is increased by the square of the radius of the gel particles. Consequently, apart from the drying method, the costs of aerogel production also increase quite considerably as the particle size increase. On grounds of cost, the result is an endeavour to produce the smallest possible aerogel particles.

On the other hand, the handling of very small particles is very complicated and thus likewise the costs entailed are unfavourable, and not every industrial application of aerogels is independent of the particle size.

Therefore, from the point of view of handling and for many applications, larger aerogel particles are needed or at least advantageous.

This problem is resolved by a method in which the aerogel particles are delivered to a mixing apparatus in which they are compressed. In this way, it is particularly simple to form small aerogel particles into larger aerogel particles.

Binder can be added to the mixing apparatus prior to, during and/or after the addition of the aerogel particles, the subsequent addition being preferred.

The aerogel particles are caused to move so that they enjoy relative movement in respect of one another by means of the mixing apparatus, which is for example an agglomerating plate, a blender or a fluidised bed unit.

Advantageously, the binder is incorporated as an aqueous or non-aqueous solution or suspension or even as a melt, for example by spraying. The binder results in a drawing-together of the aerogel particles to produce larger agglomerates.

During this process, by chemical reaction, rigidification, crystallising out due to evaporation or vaporising of the solvent, the binder results in a bonding of the mixture constituents.

According to a further advantageous embodiment, the binder is added as a solid substance. Bonding then takes place by chemical reaction of the solid substance with one or more components of the mixture or by the softening of a solid binding agent, e.g. by elevated temperatures, resulting in its becoming sticky and bonding the particles of the mixture.

Another expedient embodiment envisages that in addition to the aerogel particles, also additives and/or fillers which are present in particulate or fibre form, are added to the mixing apparatus.

In accordance with a preferred embodiment, the agglomerates are separated according to their size. Advantageously, this takes place in that from the granules produced, the target fraction is screened off in accordance with the desired granular range. Granulates which are too large can possible be comminuted, for example with a chopper or a cutter head and screened off so that they are present in the desired granular range or may be fed back to the agglomerating device after comminution. Granules which are too small optimally are recycled to the agglomerating apparatus.

In accordance with a further embodiment, the agglomerates are dried prior to being processed.

What is claimed is:

1. A method for the structural agglomeration of aerogel particles comprising the steps of feeding aerogel particles to a mixing apparatus and thoroughly mixing the aerogel particles in the mixing apparatus, wherein a binder is added to the mixing apparatus and wherein agglomerates from the mixing apparatus are separated according to their size.

2. A method according to claim 1, characterised in that the aerogel particles are presented to the mixing apparatus and the binder is then added.

3. A method according to claim 1 or 2, characterised in that the binder is incorporated as an aqueous or non-aqueous solution, as a suspension, as a melt or as a solid substance.

4. A method according to claim 1, characterised in that, in addition to the aerogel particles, also additives, fillers or both are fed into the mixing apparatus.

5. A method according to claim 1, characterized in that the agglomerates which are below a desired granular range are fed back to the mixing apparatus.

6. A method according to claim 1, characterised in that the agglomerates which are above a desired size range are communited.

7. A method according to claim 6, characterised in that comminuted agglomerates which are below a desired size are fed to the mixing apparatus.

8. A method according to claim 1, characterised in that agglomerates from the mixing apparatus are dried prior to further processing.

* * * * *